US009303886B2

(12) United States Patent
Wang

(10) Patent No.: US 9,303,886 B2
(45) Date of Patent: Apr. 5, 2016

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Fei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/548,982

(22) Filed: Nov. 20, 2014

(65) Prior Publication Data

US 2015/0369499 A1 Dec. 24, 2015

(30) Foreign Application Priority Data

Jun. 23, 2014 (CN) .......................... 2014 1 0283611

(51) Int. Cl.
*H01L 23/34* (2006.01)
*F24F 6/02* (2006.01)
*G02F 1/1335* (2006.01)

(52) U.S. Cl.
CPC .......... *F24F 6/025* (2013.01); *G02F 1/133602* (2013.01); *G02F 2001/133628* (2013.01)

(58) Field of Classification Search
CPC ................... F24F 6/10; G02F 1/33602; G02F 2001/133633
See application file for complete search history.

(56) References Cited

U.S. PATENT DOCUMENTS

| 7,755,715 B2* | 7/2010 | Kimura ............. G02F 1/133603 349/161 |
| 2007/0063338 A1* | 3/2007 | Chang ............... G02F 1/133603 257/714 |
| 2014/0002784 A1 | 1/2014 | Bang |
| 2015/0327401 A1* | 11/2015 | Maes ........................ G09F 9/30 362/97.1 |

FOREIGN PATENT DOCUMENTS

| CN | 1641440 A | 7/2005 |
| CN | 101546057 A | 9/2009 |
| CN | 102588848 A | 7/2012 |
| CN | 102691926 A | 9/2012 |
| CN | 102998844 A | 3/2013 |
| CN | 103032787 A | 4/2013 |

OTHER PUBLICATIONS

First Office Action dated Nov. 12, 2015 corresponding to Chinese application No. 201410283611.1.

* cited by examiner

*Primary Examiner* — Tracie Y Green
(74) *Attorney, Agent, or Firm* — Nath, Goldberg & Meyer; Joshua B. Goldberg

(57) ABSTRACT

The present invention provides a backlight module and a display device for solving the problem of energy waste due to insufficient use of heat generated by a backlight module in the prior art. In this case, the backlight module comprises a light source arranged at a light-incident side of a display panel to provide light for the display panel, and a hollow humidifying container arranged at the back of the light source.

13 Claims, 5 Drawing Sheets

BACKLIGHT MODULE AND DISPLAY DEVICE

FIELD OF THE INVENTION

The present invention relates to the field of liquid crystal display technology, and particularly relates to a backlight module and a display device.

BACKGROUND OF THE INVENTION

With development of TFT-LCD (Thin Film Transistor Liquid Crystal Display) technology and progress of industrial technology, as well as reduction of production cost and increasing perfection of manufacturing process of liquid crystal display devices, liquid crystal display technology has taken the place of cathode ray tube display technology as mainstream technology in daily display field. Liquid crystal display devices have become ideal display devices in the market and in the minds of consumers due to their inherent advantages.

A liquid crystal display device is a nonluminous passive display device in itself, and depends on a backlight module to achieve the display function. A structure of a display device in the prior art is now described with reference to FIGS. 1 and 2, FIG. 1 is a sectional view showing the structure of the display device in the prior art; and FIG. 2 is a schematic diagram of a lateral structure of the display device shown in FIG. 1. From FIGS. 1 and 2 it can be seen the display device comprises a housing 11, a display panel 12, and a backlight module 13 located at a side of the display panel 12, wherein the backlight module 13 is a quite important component in an LCD module, because on the one hand, performance of the backlight module 13 will have direct effect on LCD imaging quality, and on the other hand, cost of the backlight module 13 accounts for 3-5% of that of the LCD module, and power consumption thereof accounts for 75% of that of the LCD module. A highly-sophisticated large-size LCD requires high-performance backlight technology matched therewith, and therefore while LCD industry is trying to expand new application fields, high performances (such as high luminance, low cost, low power consumption, lightness and thinness, etc.) of backlight technology also play an important backstage role.

The backlight module 13 has the characteristics of high luminance, long service life, uniform light, etc. At present, backlight modules mainly include the following three types according to different luminous principles: electroluminescence (EL), cold cathode fluorescent lamp (CCFL) and light-emitting diode (LED) types; in addition, backlight modules can also be divided into edge type and direct type ones according to different distribution locations of light sources. Among them, LED backlight modules have become a mainstream in current development of backlight modules due to their advantages of energy conservation, environment-friendliness, long service life, small volume, wide color gamut, etc.

Nevertheless, backlight modules are not without shortcomings. LEDs are photoelectric devices, and only 15%-25% of electric energy is converted to light energy during their operation, and the rest of electric energy is almost all converted to heat, and the generated heat causes temperature of display devices to rise, so the problem of heat dissipation of backlight modules cannot be ignored. In the prior art, heat dissipation of backlight modules is mainly implemented in two ways, namely passive cooling and active cooling. Active cooling mainly involves increasing air flow velocity at surfaces of radiation fins by fans or other similar devices, to quickly take away heat from the radiation fins, and to further improve heat dissipation efficiency. Passive cooling means dissipating heat generated by LEDs by means of natural convection between outer surfaces of lamps (made of aluminum with high thermal conductivity) themselves and air. For passive cooling, radiation fins made of copper-aluminum alloy with relatively good heat conductivity and low cost are mainly adopted for heat dissipation, to achieve the function of protecting circuit components. For a passive cooling way, design and assembly thereof are simple, and integration into mechanical structure design of lamps is easy; protection level requirement of circuit components is relatively easy to achieve; and with low cost, it is currently a widely used heat dissipation way.

However, whichever of active cooling and passive cooling is adopted, heat generated by a backlight module cannot be used sufficiently, and energy is wasted.

SUMMARY OF THE INVENTION

Embodiments of the present invention provide a backlight module and a display device for solving the problem of energy waste due to insufficient use of heat generated by a backlight module in the prior art.

An embodiment of the present invention provides a backlight module, which comprises a light source arranged at a light-incident side of a display panel to provide light for the display panel, and a hollow humidifying container arranged at the back of the light source.

The backlight module provided by the embodiment of the present invention comprises the hollow humidifying container arranged at the back of the light source, and the hollow humidifying container is close to the light source and can absorb heat generated by the light source, so that temperature of the hollow humidifying container rises, which in turn accelerates evaporation of liquid in the hollow humidifying container, thereby not only achieving the effect of humidifying ambient environment, but also solving the problem of energy waste due to insufficient use of heat generated by the backlight module, and improving energy utilization. Meanwhile, a lot of heat generated by the backlight module is taken away by evaporation of liquid, so that heat dissipation of the backlight module is enhanced, and heat dissipation efficiency is increased.

Preferably, the hollow humidifying container is made of a material selected from a group including copper, aluminum and copper-aluminum alloy. Copper, aluminum and the alloy thereof each have good thermal conductivity and are low in cost, and thus are suitable for manufacturing the hollow humidifying container. In addition, the hollow humidifying container may also be made of other metal with relatively good thermal conductivity, such as iron, molybdenum, tin or the like, or alloy thereof.

Preferably, the cross section of the hollow humidifying container perpendicular to the extension direction of the backlight module is in a stepped shape. When the cross section of the hollow humidifying container perpendicular to the extension direction of the backlight module is in a stepped shape, the surface area of the hollow humidifying container in contact with the backlight module can be increased, so that heat generated by the backlight module can be effectively absorbed by the hollow humidifying container, to increase evaporation speed of liquid in the hollow humidifying container, thereby improving energy utilization, and at the same time increasing heat dissipation efficiency of the backlight module. In addition, the cross section of the hollow humidifying container perpendicular to the extension direction of the backlight module can be in a rectangular, concave or other shape.

Preferably, the hollow humidifying container is provided with an injection hole through which liquid is injected into the hollow humidifying container. The injection hole may also be used as a vapor hole of the hollow humidifying container, so that evaporated liquid can be discharged from the injection hole. In addition, a vapor hole can be separately provided in the hollow humidifying container. Preferably, the injection hole is used as a vapor hole at the same time to effectively simplify the structure of the hollow humidifying container.

An embodiment of the present invention provides a display device, which comprises a housing and a display panel, the display device further comprising the backlight module described above.

The display device provided by the embodiment of the present invention comprises a hollow humidifying container arranged at the back of the light source, and the hollow humidifying container is close to the light source and can absorb heat generated by the light source, so that temperature of the hollow humidifying container rises, which in turn accelerates evaporation of liquid in the hollow humidifying container, thereby achieving humidifying effect, solving the problem of energy waste due to insufficient use of heat generated by the backlight module, and improving energy utilization. Meanwhile, a lot of heat generated by the backlight module is taken away by evaporation of liquid, so that heat dissipation capability of the backlight module is enhanced, heat dissipation efficiency is increased, other components in the display device are protected from damage, and service life of the display device is prolonged.

Preferably, the display device further comprises a front frame located at the front side of the display panel and a back plate located at the rear side of the display panel, and the hollow humidifying container is tightly fitted to the front frame and/or the back plate. The front frame and the back plate of the display device are both made of metallic material, and as metallic material has good thermal conductivity, when the hollow humidifying container is tightly fitted to the front frame or/and the back plate, heat conduction speed is relatively high, and more heat is absorbed by the hollow humidifying container, which increases evaporation speed of liquid in the hollow humidifying container, is favorable for improving energy utilization, and at the same time increases heat dissipation efficiency of the backlight module.

Preferably, a mounting-and-dismounting hole through which the hollow humidifying container is taken out of the display device or the hollow humidifying container is placed into the display device is formed at a position on the housing corresponding to the hollow humidifying container, and the shape of the mounting-and-dismounting hole is matched with that of the cross section of the hollow humidifying container perpendicular to the extension direction of the backlight module. After the hollow humidifying container is used for a period of time, dirt that may be generated on a side wall thereof will deposits, which in turn affects thermal conduction function of the side walls of the hollow humidifying container, and thus the hollow humidifying container needs to be taken out of the display device regularly for cleaning, to ensure the hollow humidifying container has good thermal conductivity; in addition, it is also possible to take the hollow humidifying container out of the display device, and then put in a new hollow humidifying container to replace the container with poor thermal conductivity. Taking out the hollow humidifying container through the mounting-and-dismounting hole for cleaning or replacement can ensure the hollow humidifying container has good thermal conductivity, and further improve efficiency of the hollow humidifying container and energy utilization.

Preferably, the display device further comprises a plurality of the fixing blocks which are located between the display panel and the housing and used for preventing the display panel from sliding relatively to the housing, and at least one of the fixing blocks is arranged at the same side as the hollow humidifying container. In the display device, the display panel is fixed by means of the fixing blocks, to prevent the display panel from sliding and further affecting display function of the display device.

Preferably, the display device further comprises a liquid level perspective window which is used for observing liquid level in the hollow humidifying container and arranged at a side of the display device. Change of the liquid level in the hollow humidifying container can be observed through the liquid level perspective window, so that a user can add an appropriate amount of liquid to the hollow humidifying container according to the change of the liquid level, to avoid dryout or spillover due to injection of too much liquid, etc.

Preferably, the liquid level perspective window is provided with scale lines. The scale lines assist a user in grasping change of the liquid level in the hollow humidifying container, and injecting an appropriate amount of liquid into the hollow humidifying container according to the scale lines, to avoid dryout or spillover due to injection of too much liquid, etc.

DETAILED DESCRIPTION OF THE EMBODIMENTS

Embodiments of the present invention provide a backlight module and a display device for solving the problem of energy waste due to insufficient use of heat generated by a backlight module in the prior art.

Technical solutions in the embodiments of the present invention will be described clearly and completely in conjunction with accompanying drawings in the embodiments of the present invention, and obviously the embodiments described are only part, instead of all of the embodiments of the present invention. Based on the embodiments in the present invention, all other embodiments obtained by the person skilled in the art without inventive effort fall into the protection scope of the present invention.

Figure 1:
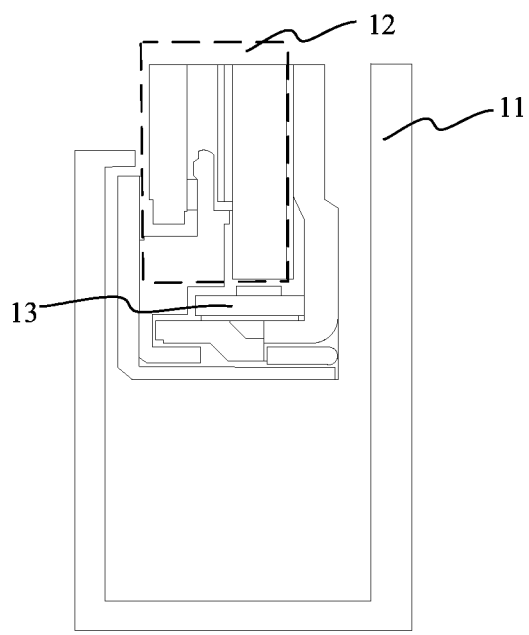
FIG. 1 is a sectional view showing a structure of a display device in the prior art.
Figure 2:
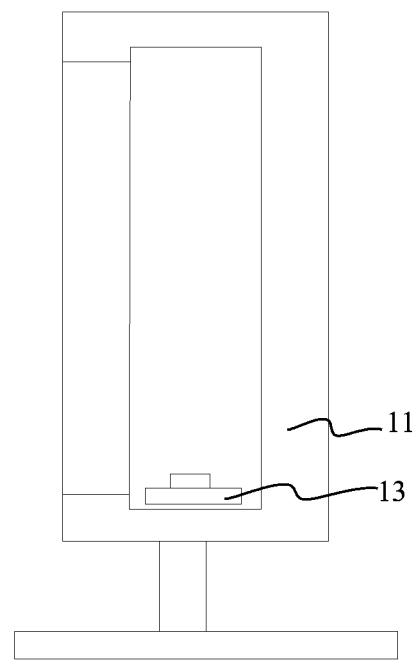
FIG. 2 is a schematic diagram of a lateral structure of the display device in FIG. 1.
Figure 3:
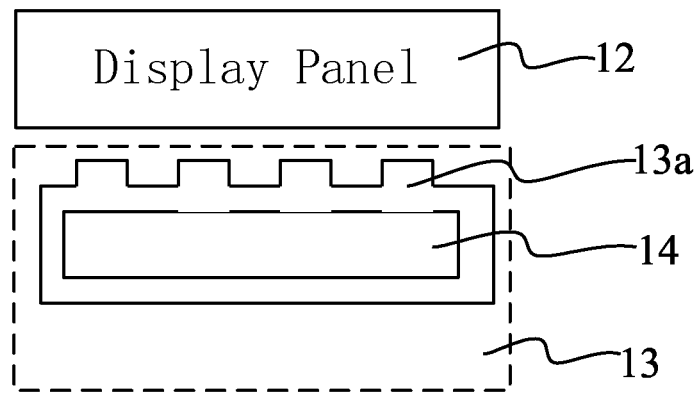
FIG. 3 is a schematic diagram of a planar structure of a backlight module provided by embodiment 1 of the present invention.

Embodiment 1 of the present invention provides a backlight module, referring to FIG. 3, the backlight module comprising a light source 13*a* arranged at a light-incident side of a display panel 12 to provide light for the display panel, and a hollow humidifying container 14 arranged at the back of the light source.

In the backlight module provided by the present embodiment, the hollow humidifying container 14 arranged at the back of the light source is included, and the hollow humidifying container 14 is close to the light source 13*a* and can absorb heat generated by the light source 13*a*, so that temperature of the hollow humidifying container 14 rises, which in turn accelerates evaporation of liquid in the hollow humidifying container 14, thereby not only achieving the effect of humidifying ambient environment, but also solving the problem of energy waste due to insufficient use of heat generated by the backlight module, and improving energy utilization. Meanwhile, a lot of heat generated by the backlight module is taken away by evaporation of liquid, so that heat dissipation of the backlight module is enhanced, and heat dissipation efficiency is increased.

Further, the hollow humidifying container 14 is made of a material selected from a group including copper, aluminum and copper-aluminum alloy. Copper, aluminum and their alloy each have good thermal conductivity and are low in cost, and thus are suitable for manufacturing the hollow humidifying container. In addition, the hollow humidifying container 14 may also be made of other metal with relatively good thermal conductivity, such as iron, molybdenum, tin or the like, or their alloy.

The cross section of the hollow humidifying container 14 perpendicular to the extension direction of the backlight module 13 is in a stepped shape. When the cross section of the hollow humidifying container perpendicular to the extension direction of the backlight module is in a stepped shape, the surface area of the hollow humidifying container in contact with the backlight module can be increased, so that heat generated by the backlight module can be effectively absorbed by the hollow humidifying container, which increases evaporation speed of liquid in the hollow humidifying container, thereby improving energy utilization, and at the same time increasing heat dissipation efficiency of the backlight module. In addition, the cross section of the hollow humidifying container perpendicular to the extension direction of the backlight module can be in a rectangular, concave or other shape.

The hollow humidifying container 14 is provided with an injection hole 15 through which liquid is injected into the hollow humidifying container. The injection hole 15 may also be used as a vapor hole of the hollow humidifying container 14, so that evaporated liquid can be discharged from the injection hole. In addition, a vapor hole can be additionally provided in the hollow humidifying container 14. Preferably, the injection hole can be used as a vapor hole at the same time, to effectively simplify structure of the hollow humidifying container.

Figure 4:
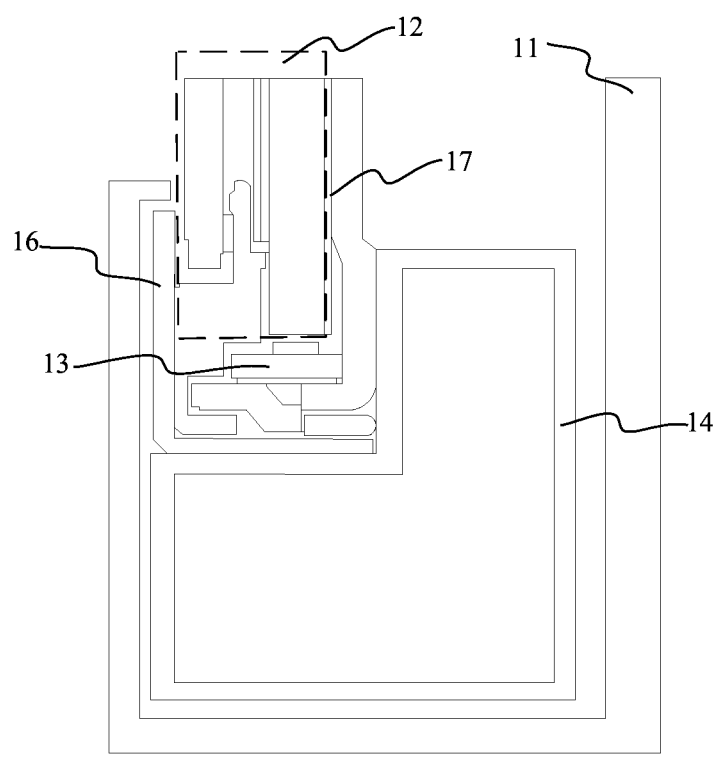
FIG. 4 is a sectional view showing a structure of a display device provided by embodiment 2 of the present invention.
Figure 5:
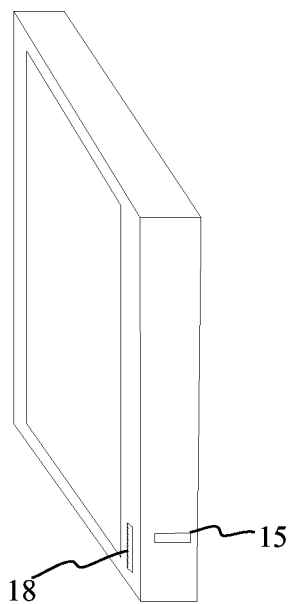
FIG. 5 is a sectional view of a lateral structure of the display device provided by embodiment 2 of the present invention.

Next, a display device provided by embodiment 2 of the present invention will be described with reference to FIGS. 4 and 5, wherein FIG. 4 is a sectional view of planar structure of the display device provided by embodiment 2 of the present invention, and FIG. 5 is sectional view of lateral structure of the display device provided by embodiment 2 of the present invention. From FIGS. 4 and 5 it can be seen the display device comprises a housing 11, a display panel 12, and the backlight module 13 provided by embodiment 1 of the present invention located at a side of the display panel 12.

Further, the display device further comprises a front frame 16 located at the front side of the display panel 12, and a back plate 17 located at the rear side of the display panel 12, both the front frame 16 and the back plate 17 being tightly fitted to the hollow humidifying container 14. As the front frame 16 and the back plate 17 are both made of metallic material, both the front frame 16 and the back plate 17 have good thermal conductivity, and thus when the hollow humidifying container is tightly fitted to the front frame and the back plate, heat conduction speed is relatively high, and more heat is absorbed by the hollow humidifying container, which increases evaporation speed of liquid in the hollow humidifying container, is favorable for improving energy utilization, and at the same time increases heat dissipation efficiency of the backlight module.

Further, it can also be seen from FIG. 5 that the display device further comprises a liquid level perspective window 18 for observing liquid level in the hollow humidifying container, arranged at a side of the display device. Change of the liquid level in the hollow humidifying container can be observed through the liquid level perspective window 18, so that a user can add liquid for evaporation to absorb heat to the hollow humidifying container according to the change of the liquid level, to avoid dryout or spillover due to injection of too much liquid in the hollow humidifying container, etc.

Figure 6:
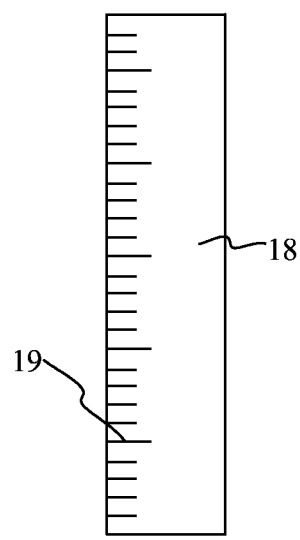
FIG. 6 is a structure diagram of a liquid level perspective window in the display device in FIG. 5.

Further, FIG. 6 schematically shows a structure of the liquid level perspective window in the display device in FIG. 5, and the liquid level perspective window 18 is provided with scale lines 19, as shown in FIG. 6; the scale lines assist a user in grasping change of the liquid level in the hollow humidifying container and injecting an appropriate amount of liquid to the hollow humidifying container according to the scale lines, to avoid dryout or spillover due to injection of too much liquid, etc.

Figure 7:
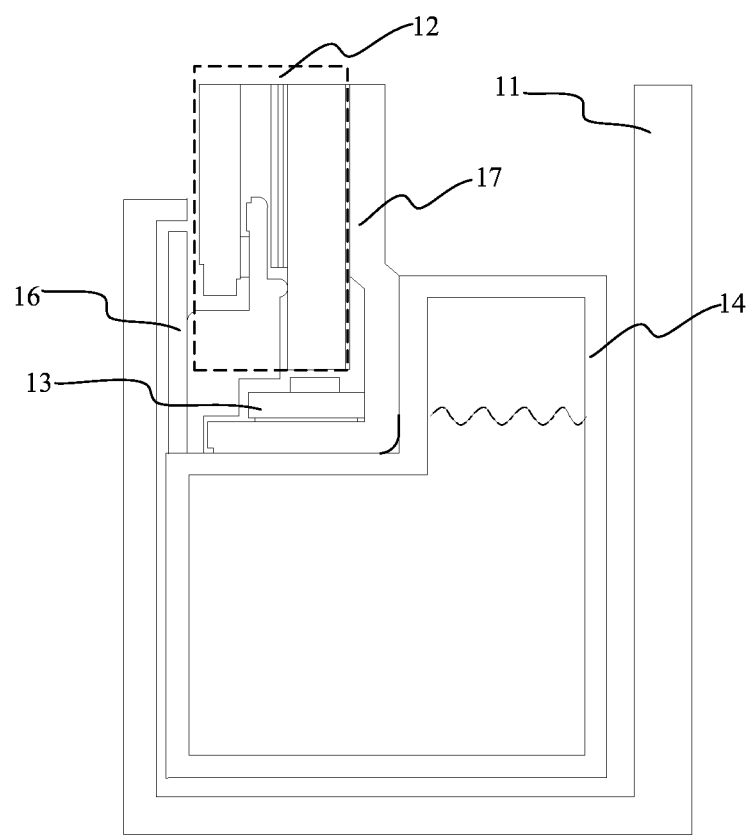
FIG. 7 is a sectional view showing a structure of a display device provided by embodiment 3 of the present invention.

FIG. 7 is a diagram of a planar structure of a display device provided by embodiment 3 of the present invention. It can be seen from FIG. 7 that the structure of the display device provided by embodiment 3 of the present invention is substantially the same as that of the display device provided by embodiment 2 of the present invention, and their differences lie in that:

In the display device provided by embodiment 2 of the present invention, as shown in FIG. 4, the front frame 16 is "L" shaped, forming a semi-enclosure structure for the display panel 12 and the backlight module 13, and frame sealant is disposed between the front frame 16 and the back plate 17. However, in the display device provided by embodiment 3 of the present invention, the back plate 17 is "⌐" shaped, forming a semi-enclosure structure for the display panel 12 and the backlight module 13, and is in contact with the display panel 12 in the horizontal direction; the portion of the front frame 16 in the horizontal direction is cut off, and meanwhile the frame sealant disposed between the front frame 16 and the back plate 17 is also cut off, so that in the horizontal direction only the back plate 17 is tightly fitted to the hollow humidifying container, and heat is transferred to the hollow humidifying container through the back plate 17. In the display device provided by embodiment 3 of the present invention, as the frame sealant is a poor conductor of heat, after that the frame sealant disposed between the front frame 16 and the back plate 17 is cut off, adverse effect of the frame sealant portion on heat dissipation is avoided; and meanwhile, as the back plate 17 is made of metallic material, which is a good conductor of heat, when the back plate 17 is tightly fitted to the hollow humidifying container, it is favorable for accelerating heat transfer between the backlight module and the hollow humidifying container, which in turn increases evaporation speed of liquid in the hollow humidifying container, improves energy utilization, and at the same time increases heat dissipation efficiency of the backlight module.

Figure 8:
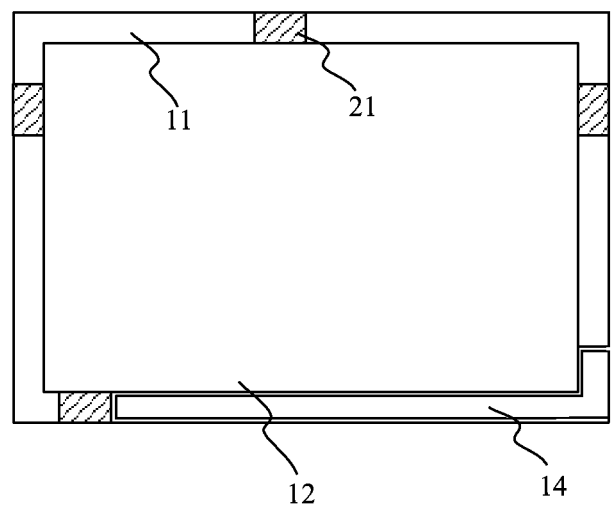
FIG. 8 is a sectional view of a planar structure of a display device provided by embodiment 4 of the present invention.
Figure 9:
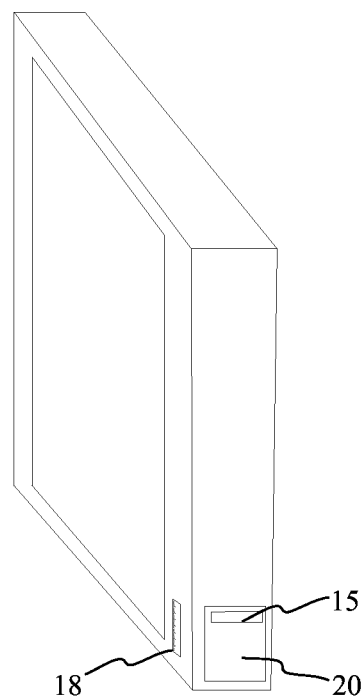
FIG. 9 is a sectional view of a lateral structure of the display device provided by embodiment 4 of the present invention.

Next, a display device provided by embodiment 4 of the present invention will be described with reference to FIGS. 8 and 9, wherein FIG. 8 is a sectional view of a planar structure of the display device provided by embodiment 4 of the present invention, and FIG. 9 is a sectional view of a lateral structure of the display device provided by embodiment 4 of the present invention. It can be seen from FIGS. 8 and 9 that the structure of the display device provided by embodiment 4 of the present invention is substantially the same as that of the display device provided by embodiment 2 of the present invention, and their difference lies in that that the display device provided by embodiment 4 of the present invention also comprises a mounting-and-dismounting hole 20 and a plurality of fixing blocks 21.

Specifically, the mounting-and-dismounting hole 20 is located at a position on the housing 11 corresponding to the hollow humidifying container, and the hollow humidifying container 14 is taken out of the display device or the hollow humidifying container 14 is put into the display device through the mounting-and-dismounting hole 20; and the shape of the mounting-and-dismounting hole 20 is matched with that of the cross section of the hollow humidifying container 14 perpendicular to the extension direction of the backlight module. After the hollow humidifying container is used for a period of time, dirt may deposit on a side wall of the hollow humidifying container and affect thermal conduction function of the hollow humidifying container, and thus the hollow humidifying container needs to be taken out of the display device regularly for cleaning, to ensure the hollow humidifying container has good thermal conductivity; in addition, it is also possible to take out a hollow humidifying container with poor thermal conductivity after a period of use, and then put in a new hollow humidifying container. Taking out the hollow humidifying container through the mounting-and-dismounting hole for cleaning or replacement can ensure the hollow humidifying container has good thermal conductivity all the time, and further improve efficiency of the hollow humidifying container and energy utilization.

A plurality of the fixing blocks 21 are located between the display panel 12 and the housing 11, for preventing the display panel 12 from sliding relatively to the housing 11, and at least one of the fixing blocks 21 is arranged at the same side as the hollow humidifying container 14. In the display device, the display panel is fixed by means of the fixing blocks, to prevent the display panel from sliding and affecting display function of the display device.

Embodiment 5 of the present invention provides a display device, and the structure of the display device provided by embodiment 5 of the present invention is substantially the same as that of the display device provided by embodiment 4 of the present invention, and their differences lie in that:

In the display device provided by embodiment 4 of the present invention, the front frame 16 is "L" shaped, forming a semi-enclosure structure for the display panel 12 and the backlight module 13, and frame sealant is provided between the front frame 16 and the back plate 17. However, in the display device provided by embodiment 5 of the present invention, the back plate 17 is "⌐" shaped, forming a semi-enclosure structure for the display panel 12 and the backlight module 13, and is in contact with the display panel 12 in the horizontal direction; the portion of the front frame 16 in the horizontal direction is cut off, and meanwhile the frame sealant disposed between the front frame 16 and the back plate 17 is also cut off, so that in the horizontal direction only the back plate 17 is tightly fitted to the hollow humidifying container, and heat is transferred to the hollow humidifying container through the back plate 17. In the display device provided by embodiment 5 of the present invention, as the frame sealant is a poor conductor of heat, after that the frame sealant disposed between the front frame 16 and the back plate 17 is cut off, adverse effect of the frame sealant portion on heat dissipation is avoided; and meanwhile, as the back plate 17 is made of metal, which is a good conductor of heat, when the back plate 17 is tightly fitted to the hollow humidifying container, it is favorable for accelerating heat transfer between the backlight module and the hollow humidifying container, which in turn increases evaporation speed of liquid in the hollow humidifying container, improves energy utilization, and at the same time increases heat dissipation efficiency of the backlight module.

The display device provided by the present invention includes the hollow humidifying container, which is close to the light source and can absorb heat generated by the light source, so that temperature of the hollow humidifying container rises, which in turn accelerates evaporation of liquid in the hollow humidifying container, thereby not only achieving the effect of humidifying ambient environment, but also solving the problem of energy waste due to insufficient use of heat generated by the backlight module, and improving energy utilization. Meanwhile, a lot of heat generated by the backlight module is taken away by evaporation of liquid, so that heat dissipation of the backlight module is enhanced, heat dissipation efficiency is increased, other components in the display device are protected from damage, and service life of the display device is prolonged.

Obviously, various modifications and variations can be made to the present invention by the person skilled in the art without departing from the spirit and scope of the present invention. Thus the present invention is also intended to encompass these modifications and variations thereto so long as these modifications and variations are within the scope of the claims of the present invention and their equivalents.

The invention claimed is:

1. A backlight module, comprising a light source arranged at a light-incident side of a display panel to provide light for the display panel, and a hollow humidifying container arranged at the back of the light source.

2. The backlight module according to claim 1, wherein the hollow humidifying container is made of a material selected from a group including copper, aluminum and copper-aluminum alloy.

3. The backlight module according to claim 1, wherein the cross section of the hollow humidifying container perpendicular to the extension direction of the backlight module is in a stepped shape.

4. The backlight module according to claim 1, wherein the hollow humidifying container is provided with an injection hole through which liquid is injected into the hollow humidifying container.

5. A display device, comprising a housing and a display panel, wherein the display device further comprises a backlight module, the backlight module includes a light source arranged at a light-incident side of the display panel to provide light for the display panel and a hollow humidifying container arranged at the back of the light source.

6. The display device according to claim 5, wherein the hollow humidifying container is made of a material selected from a group including copper, aluminum and copper-aluminum alloy.

7. The display device according to claim 5, wherein the cross section of the hollow humidifying container perpendicular to the extension direction of the backlight module is in a stepped shape.

8. The display device according to claim 5, wherein the hollow humidifying container is provided with an injection hole through which liquid is injected into the hollow humidifying container.

9. The display device according to claim 5, wherein the display device further comprises a front frame located at the front side of the display panel, and a back plate located at the rear side of the display panel, the hollow humidifying container is tightly fitted to the front frame and/or the back plate.

10. The display device according to claim 5, wherein a mounting-and-dismounting hole through which the hollow humidifying container is taken out of the display device or the hollow humidifying container is placed into the display device is formed at a position on the housing corresponding to the hollow humidifying container, and the shape of the mounting-and-dismounting hole is matched with that of the cross section of the hollow humidifying container perpendicular to the extension direction of the backlight module.

11. The display device according to claim 10, wherein the display device further comprises a plurality of the fixing blocks which are located between the display panel and the housing and used for preventing the display panel from sliding relatively to the housing, and at least one of the fixing blocks is arranged at the same side as the hollow humidifying container.

12. The display device according to claim 5, wherein the display device further comprises a liquid level perspective window which is used for observing liquid level in the hollow humidifying container and arranged at a side of the display device.

13. The display device according to claim 12, wherein the liquid level perspective window is provided with scale lines.

* * * * *